UNITED STATES PATENT OFFICE.

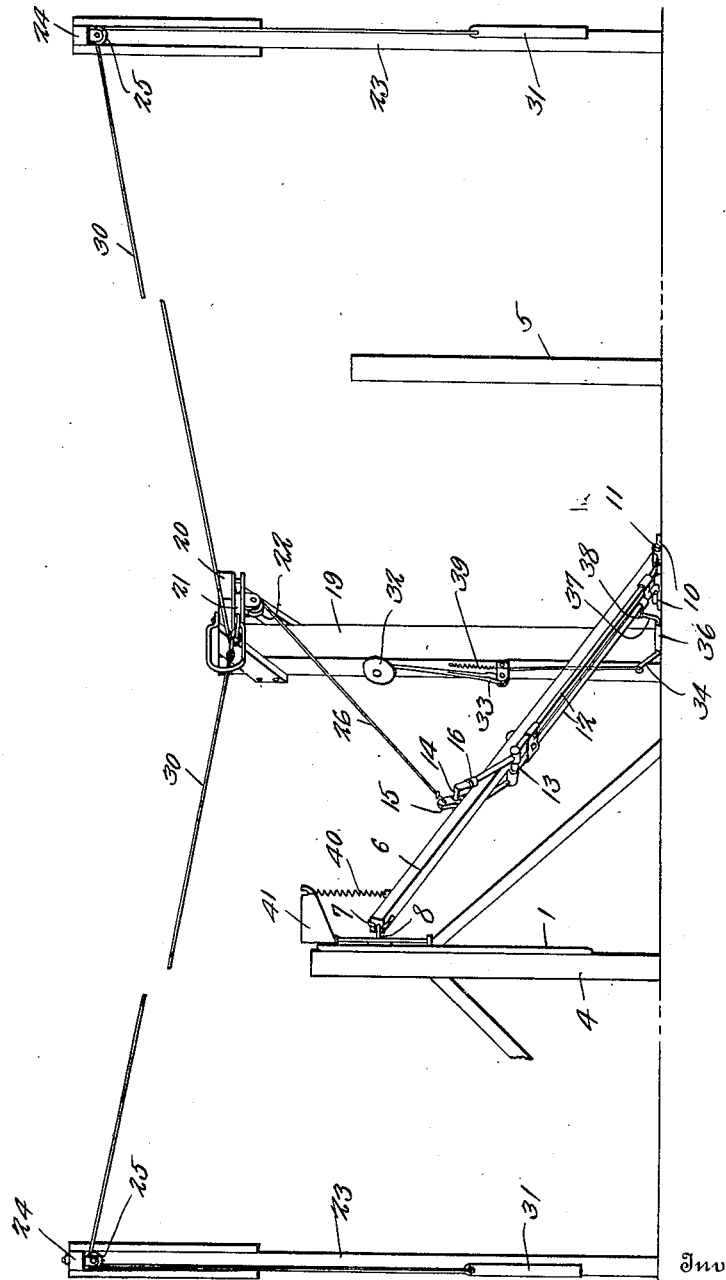

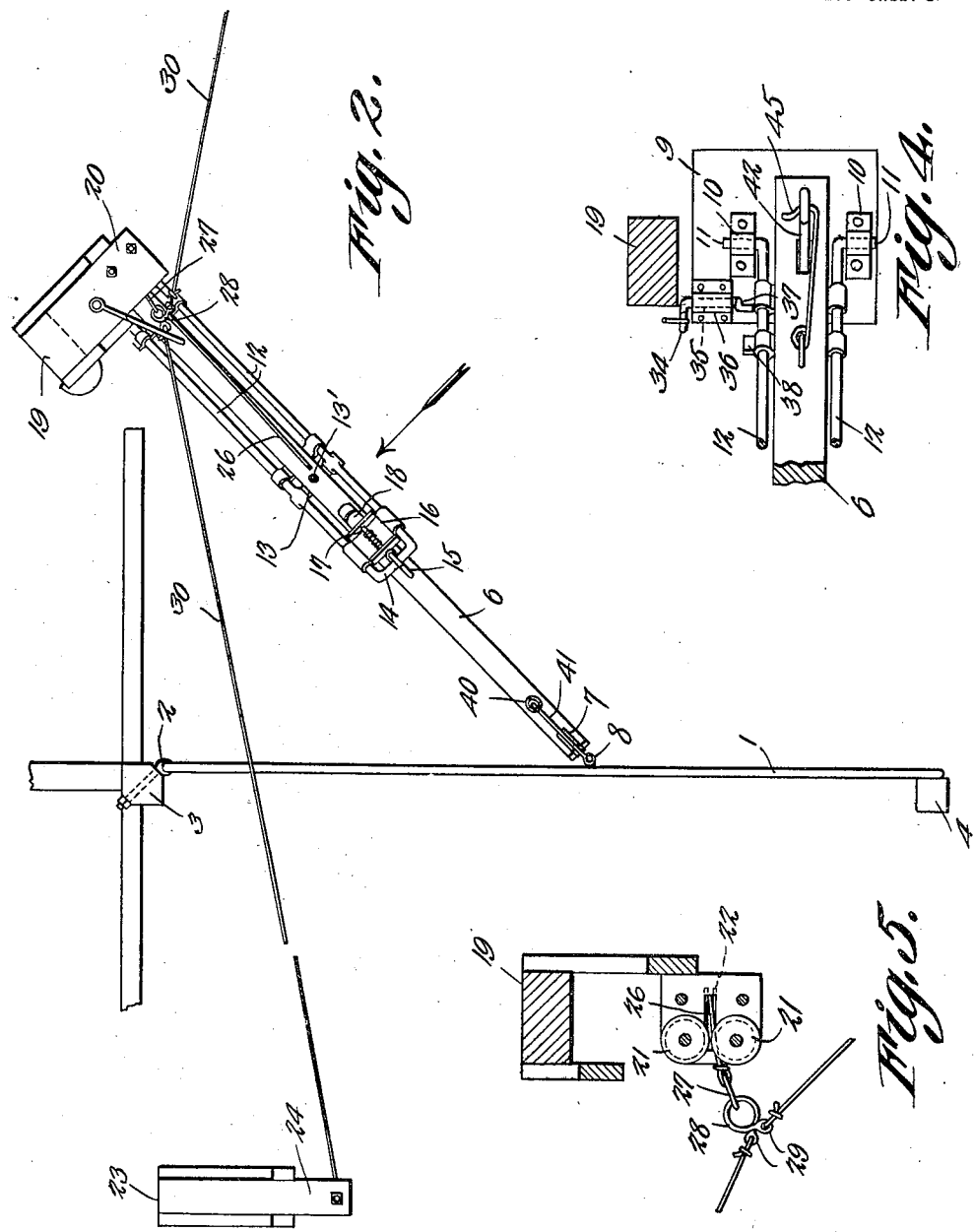

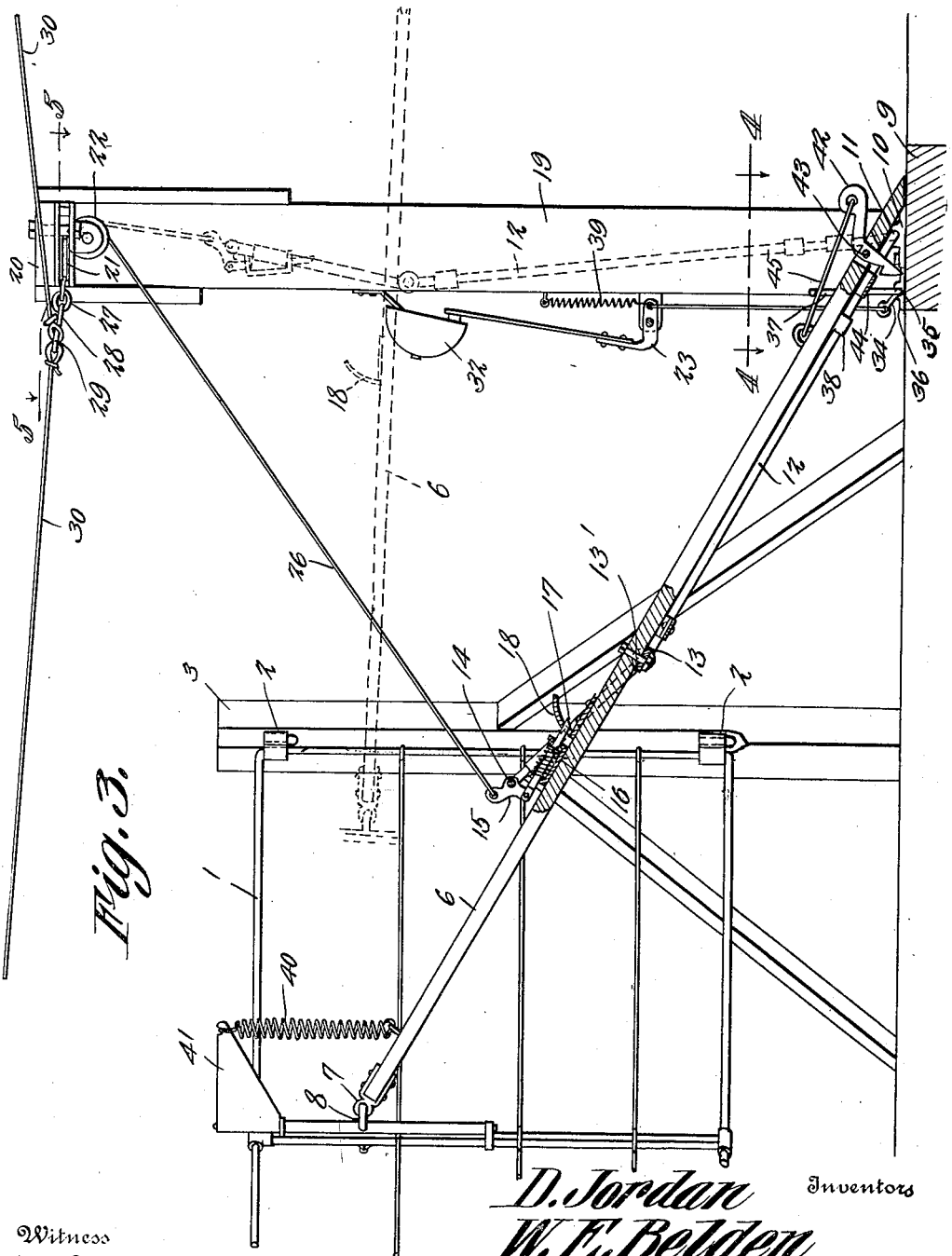

DANIEL JORDAN AND WILLIAM E. BELDEN, OF HARRISON, NEBRASKA.

GATE-OPERATING DEVICE.

1,334,460.  Specification of Letters Patent.  Patented Mar. 23, 1920.

Application filed July 23, 1919. Serial No. 312,737.

*To all whom it may concern:*

Be it known that we, DANIEL JORDAN and WILLIAM E. BELDEN, citizens of the United States, residing at Harrison, in the county of Sioux, State of Nebraska, have invented a new and useful Gate-Operating Device, of which the following is a specification.

This invention relates to farm gates of that class that may be opened or closed from a point remote from the gate, and has for its object the provision of operating means for the gate by which a person may open and close the gate when seated in a vehicle or on a horse.

Provision is also made for audibly giving notice that the gate is closed.

Another object is the provision of a hingedly connected bar, which serves upon actuation by suitable mechanism, not only to open and close the gate but to form a brace or prop whereby the gate is positively held in closed position.

Another object is the provision whereby the operating mechanism may be locked, so that a person on the outside will be prevented from opening the gate.

With these and other objects in view, as will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit or sacrificing any of the advantages of the invention.

In the drawing Figure 1 is a view in elevation of the device,

Fig. 2 is a top plan view of the same drawn to a slightly larger scale,

Fig. 3 is a side elevation as viewed in the direction indicated by the arrow in Fig. 2, Fig. 4 is a sectional view taken on line 4—4 of Fig. 3, Fig. 5 is a section taken on line 5—5 of Fig. 3.

Referring specifically to the drawings by characters of reference the numeral 1 designates a gate of any construction hinged at 2 to a post 3 and closing against a post 4. A post 5 located along the driveway serves as a stop for the gate as it is swung to open position. A bar 6 is pivoted at one end through a shackle 7 to an eye 8 secured to the gate intermediate its ends. The bar 6 extends downwardly and away from the gate and is angularly disposed with relation to the length of the gate, the lower end resting on a base 9 at the side of the driveway.

Secured to the base 9 are a pair of bearings 10, which carry trunnions 11 formed on the ends of rods 12, beneath and at opposite sides of the bar 6 and extending parallel therewith to a point approximately midway the length of the bar 6 where a crosspiece 13 is swiveled at its ends to the rods 12 and secured at 13′ to the bar 6.

From the connection 13 the rods extend diagonally to the top of the bar 6 where connection of the rods 12 by a crosspiece 14, affords a fulcrum for a latch lever 15. A bracket 16 supported between the rods 12 carry a spring pressed latch bolt 17, which is actuated by the lever 15 and engages, when the gate is closed, a latching plate 18 secured to the bar 6. A post 19 is placed adjacent the base 9 and has an arm 20 suitably braced, the arm 20 supports on its under side a pair of guide sheaves 21 and a pulley 22.

Standing alongside the roadway on opposite approaches to the gate and removed therefrom an appropriate distance, are posts 23, each provided with an extending arm 24 having a pulley 25 supported from each of the arms.

A rope or other flexible element 26 is connected to the free end of the lever 15 and is trained over the pulley 22 thence between the sheaves 21 where it is provided with a ring 27 which is connected to a second ring 28 having loops 29, to which are connected ropes 30 said ropes are trained over the pulleys 25 on the posts 23 and hang within convenient reach of a person on the ground, the end being provided with a counterweight 31 which keeps the ropes taut and provides a hand hold for operating the device.

The signal for notifying a person, after passing through the gate that the same is closed comprises a bell 32 secured to the post 19 a bell crank lever 33 is pivoted to a bracket also secured to the post 19, one arm of the lever carrying a clapper and the other arm being connected to an arm 34 on a rock shaft 35 mounted in a bearing 36 secured to the base 9 another arm 37 upstanding and having a crank end which projects in the path of a striking plate 38, for operating the bell. A spring 39 retains the lever 33 in normal operative position.

In manipulating the device to open the gate, a pull on either of the ropes 30 will first withdraw the latch 15 from the latch plate 18, further pulling of the operating rope will lift the bar 6 the same swinging on the pivotal connection at 8, the rods 12 which form a lever pivoted at 11 swing about the point 11 and by reason of the connection with the bar 6 at 13' the gate is pulled open until the bar 6 and lever 12 arrive at the position shown in dotted lines on Fig. 3. At this point the operator ceases to pull on the rope 30 and the momentum of the gate carries the bar 6 and lever 12 over the dead center position whereupon the weight of the said parts carry the gate to full open position against the post 5. Closure of the gate is effected in the same manner. A spring 40 supported at one end to a bracket 41 extending from the gate and secured at the other end to the bar 6, partially counterbalances the weight of the bar 6 to prevent undue slam of the gate when closing.

The lower end of the bar 6 is provided with a latch 42 pivoted at 43 to the bar, the latch being adapted to engage a plate 44 which is secured to the rods 12 and thus prevent operation of the bar 6 when it is desired to prevent operation of the gate in the usual manner. A hook 45 engages the latch to normally hold the same out of engagement with the plate 44.

A gate constructed in accordance with this invention is inexpensive in installation and is positive in action. When closed it being practically impossible to open the same except by means of the operating mechanism provided.

Having thus described the invention, what is claimed is:

1. The combination with a gate, of a bar pivotally connected to the gate; a lever fulcrumed remote from the gate, the lever comprising parallel arms, the arms being spaced to receive the bar therebetween; a bearing for each of the arms for pivotally connecting the same to the bar; a latch carried by the arms for releasably securing the bar and lever together; and means for operating the latch, bar and lever to open and close the gate.

2. The combination with a gate, of a bar pivotally connected to the gate; a lever fulcrumed remote from the gate, the lever comprising a pair of parallel spaced arms being connected at one end and provided at the other end with elongated bearings, the arms being pivotally connected intermediate their ends by spaced bearings to the bar, said spaced bearings serving to prevent relative lateral motion between the bar and the lever; means for latching the bar and lever together; and means for swinging the bar and lever to open and close the gate.

3. The combination with a gate, of a bar pivotally connected to the gate; a lever fulcrumed remote from the gate, the bar and lever being hingedly connected for swinging movement to open and close the gate; means for operating the bar and lever from either side of the gate to open the gate; and a latch for connecting the bar and the lever to prevent operation of the gate from one side of the gate.

4. The combination with a gate, of a bar pivoted at one end to the gate; a lever fulcrumed at a point remote from the gate and hingedly connected to the bar; a latch forming a releasable connection between the lever and the bar; means connected with the latch and accessible from one side of the gate for releasing the latch and swinging the bar and the lever to open the gate; and a second latch forming a releasable connection between the bar and the lever, the second latch being inaccessible from said side of the gate.

5. The combination with a gate, of a bar pivoted at one end to the gate; a lever fulcrumed at a point remote from the gate and hingedly connected to the bar intermediate the ends of the bar and intermediate the ends of the lever; a latch forming a releasable connection between one end of the lever and the bar; means connected with the latch and accessible from one side of the gate for releasing the latch and swinging the bar and the lever to open the gate; and a second latch forming a releasable connection between the other end of the bar and the lever, the second latch being inaccessible from said side of the gate In testimony that we claim the foregoing as our own, we have hereto affixed our signatures in the presence of two witnesses.

DANIEL JORDAN.
WILLIAM E. BELDEN.

Witnesses:
J. L. GERLACH,
E. CORBIN.